(12) United States Patent
Seo

(10) Patent No.: US 9,936,567 B2
(45) Date of Patent: Apr. 3, 2018

(54) LED ILLUMINATION SYSTEM AND METHOD FOR CONTROLLING THE SAME

(71) Applicant: SAMJIN LND CO., LTD., Hwaseong-si (KR)

(72) Inventor: Eunseok Seo, Seoul (KR)

(73) Assignee: SAMJIN LND CO., LTD., Hwaseong-si (KR)

( * ) Notice: Subject to any disclaimer, the term of this patent is extended or adjusted under 35 U.S.C. 154(b) by 0 days.

(21) Appl. No.: 15/414,411

(22) Filed: Jan. 24, 2017

(65) Prior Publication Data
US 2017/0295626 A1    Oct. 12, 2017

(30) Foreign Application Priority Data

Apr. 7, 2016  (KR) ......................... 10-2016-0043001

(51) Int. Cl.
*H04W 28/06* (2009.01)
*H05B 37/02* (2006.01)
*H05B 33/08* (2006.01)

(52) U.S. Cl.
CPC ..... *H05B 37/0272* (2013.01); *H05B 33/0842* (2013.01); *H05B 37/0227* (2013.01)

(58) Field of Classification Search
CPC ............ H05B 37/0272; H05B 37/0227; H05B 37/0218; H05B 37/0245; H05B 33/0803;
(Continued)

(56) References Cited

U.S. PATENT DOCUMENTS

2010/0301834 A1* 12/2010 Chemel ................ H05B 37/029
324/105
2011/0235325 A1* 9/2011 Ramer .................. F21V 7/0008
362/235
(Continued)

FOREIGN PATENT DOCUMENTS

KR    10-2010-0032171 A    3/2010
KR    10-2012-0116201 A    10/2012
KR    10-2014-0006944 A    1/2014

OTHER PUBLICATIONS

Author: Nakamura, Title: Dimmer, Detector, lighting control system, controller and apparatus control system, date: Sep. 28, 2015 (Original).*

(Continued)

*Primary Examiner* — Douglas W Owens
*Assistant Examiner* — Wei Chan
(74) *Attorney, Agent, or Firm* — KORUS Patent, LLC; Seong Il Jeong

(57) ABSTRACT

An LED illumination system includes a plurality of LED lamps. Each of the LED lamps includes: an LED array including one or more LED elements that interoperate with input power and emit light; a power management unit that controls supplied power so that power is input to the LED array; a control unit that controls the power management unit to control an operation of the LED array in response to a signal input set by a user through a user terminal; and a wireless communication module that transmits a received wireless communication signal to the control unit and transmits information received from the control unit in the form of a wireless communication signal.

16 Claims, 3 Drawing Sheets

(58) Field of Classification Search
CPC .............. H05B 37/0263; H05B 37/029; H05B 33/0809; H05B 33/0815; H05B 33/0833; H05B 33/0842; H05B 33/0845; H05B 33/0854; H04W 72/042; H04W 28/04; H04W 28/06; H04W 72/04; H04W 52/343; H04W 72/082; H04W 52/143; H04W 52/244; H04W 52/247; H04W 52/367; H04W 52/60; H04W 68/005; H04W 72/0413; H04W 72/0426
USPC ........ 315/152, 158, 294, 312; 370/254, 241, 370/252
See application file for complete search history.

(56) References Cited

U.S. PATENT DOCUMENTS

| | | | | |
|---|---|---|---|---|
| 2011/0235636 A1* | 9/2011 | Hsiu | ................. | H04L 12/18 370/390 |
| 2013/0141011 A1* | 6/2013 | Fushimi | ................. | H05B 37/02 315/294 |
| 2014/0009063 A1* | 1/2014 | Cregg | ................. | H05B 37/0272 315/34 |
| 2015/0130365 A1* | 5/2015 | Kim | ................. | H05B 37/0272 315/209 R |
| 2015/0142714 A1* | 5/2015 | Golota | ................. | H04L 67/10 706/23 |
| 2015/0187209 A1* | 7/2015 | Brandt | ................. | G08C 19/00 340/12.22 |
| 2015/0366039 A1* | 12/2015 | Noori | ................. | H05B 37/0272 315/307 |
| 2016/0353555 A1* | 12/2016 | Chen | ................. | H05B 37/0272 |

OTHER PUBLICATIONS

Author: Nakamura, Title: Dimmer, Detector, lighting control system, controller and apparatus control system, date: Sep. 28, 2015 (Translation).*

* cited by examiner

LED ILLUMINATION SYSTEM AND METHOD FOR CONTROLLING THE SAME

CROSS-REFERENCE TO RELATED APPLICATION

This application claims the benefit of Korean Patent Application No. 10-2016-0043001, filed on Apr. 7, 2016 in the Korean Intellectual Property Office, the disclosure of which is incorporated herein in its entirety by reference.

BACKGROUND OF THE INVENTION

1. Field of the Invention

The present invention relates to an LED illumination system and a method for controlling the same, and more particularly, to an LED illumination system, in which LED lamps are configured in a mesh network based on a wireless communication so that the LED illumination system is easily controlled by using a user terminal, and a method for controlling the LED illumination system.

2. Description of the Related Art

Generally, since an LED device does not use a gas or filament, the LED device is shock-resistant and safe, has low power consumption, can reduce a fatigue of an optic nerve, has a semi-permanent lifespan, can exhibit an illumination effect with various colors, and uses a small light source to thereby achieve a reduction in size.

In particular, since the LED device has low energy consumption, an LED lamp using the LED device is considered as a next-generation illumination device.

Like incandescent lamps or fluorescent lamps, LED lamps constitute a system to operate according to operations of switches provided on a wall.

However, in the case of an LED illumination system having such a configuration, it is inconvenient for a user to directly operate the switches provided on the wall so as to turn on or off the LED lamps.

In this regard, in order to operate an LED illumination system by using wireless communication with a user terminal, the LED illumination system has recently been configured by installing wireless communication modules on a wall or adding wireless communication modules to one or more LED lamps constituting the LED illumination system.

However, in a case where the wireless communication module is installed on the wall, the user must move to a wall region capable of communicating with the wireless communication module so as to operate the LED illumination system. Also, the LED illumination system may not be operated at a position outside of a wireless communication area.

In a case where the wireless communication module is added to an LED lamp located at a specific position, the position of the wireless communication module must be designed and arranged to ensure a maximally wide communication range such that LED lamps to which the wireless communication modules capable of directly communicating with a user terminal are added are not overlapping each other.

However, in a case where a new LED lamp is added to a network configured by LED lamps to which the wireless communication modules are added, or a previously installed LED lamp is removed therefrom, a change in a phase of a network may occur or a communication termination of a network may be caused.

Also, when installing the LED lamps, it is necessary to predefine and arrange a bridge node for performing direct communication with the user terminal among the LED lamps to which the wireless communication modules are added. However, if workers who actually install the LED lamps do not accurately arrange the LED lamp serving as the bridge node at a designed position due to lack of technical understanding about the corresponding contents, the communication with the user terminal may not be enabled and the LED illumination system may not be operated accordingly.

For example, an LED illumination system disclosed in Patent Document 1 can remotely control an LED lamp by using a personal terminal such as a smartphone that an individual holds. However, in a case where a new LED lamp is added to a network configured by LED lamps to which the wireless communication modules are added, or a previously installed LED lamp is removed therefrom, a change in a phase of a network may occur or a communication termination of a network may be caused. If workers who actually install the LED lamps do not accurately arrange the LED lamp serving as the bridge node at a designed position due to lack of technical understanding about the corresponding contents, the communication with the user terminal may not be enabled and the LED illumination system may not be operated accordingly.

PRIOR ART DOCUMENT

Patent Document

Patent Document 1 KR 10-2012-0116201 A 2012 Oct. 22.

SUMMARY OF THE INVENTION

An aspect of the present invention is to solve the above-described problems.

Another aspect of the present invention is to provide an LED illumination system, which is capable of being operated by using a user terminal without regard to a position of the user terminal, and a method for controlling the LED illumination system.

Another aspect of the present invention is to provide an LED illumination system, which is capable of being operated without regard to a position of a user terminal, whereby a position of a wireless communication module for a bridge node need not be set, and a method for controlling the LED illumination system.

Another aspect of the present invention is to provide an LED illumination system, which enables a bridge node to be dynamically configured according to a position of a user terminal, whereby a position of the bridge node need not be set and the installation of the LED illumination system is facilitated, and a method for controlling the LED illumination system.

According to one or more embodiments, there is provided an LED illumination system including a plurality of LED lamps, each LED lamp including: an LED array including one or more LED elements that interoperate with input power and emit light; a power management unit that controls supplied power so that power is input to the LED array; a control unit that controls the power management unit to control an operation of the LED array in response to a signal input set by a user through a user terminal; and a wireless communication module that transmits a received wireless communication signal to the control unit and transmits information received from the control unit in the form of a wireless communication signal, wherein the wireless communication modules of the LED lamps form mesh nodes for constituting a wireless mesh network, a bridge mode of at least one of the mesh nodes is enabled, when a control signal is received from the user terminal, the mesh node having the enabled bridge mode transmits rank information for connection to the user terminal corresponding to a distance to the user terminal and the mesh node's own traffic, the mesh node compares rank information received from a neighboring mesh node having an enabled bridge mode with the mesh node's own rank information and generates a rank for connection to the user terminal, when the generated rank is not a higher priority, the mesh node excludes itself from the rank for connection to the user terminal, and when the generated rank is a higher priority, the mesh node operates as a bridge node for connection between the user terminal and the wireless mesh network.

According to one or more embodiments, there is provided a method for controlling an LED illumination system including a plurality of LED lamps, each LED lamp including: an LED array including one or more LED elements that interoperate with input power and emit light; a power management unit that controls supplied power so that power is input to the LED array; a control unit that controls the power management unit to control an operation of the LED array in response to a signal input set by a user through a user terminal; and a wireless communication module that transmits a received wireless communication signal to the control unit and transmits information received from the control unit in the form of a wireless communication signal, the method including: a first operation in which the wireless communication modules of the LED lamps form mesh nodes for constituting a wireless mesh network, and a bridge mode of at least one of the mesh nodes is activated; and a second operation in which, when a control signal is received from the user terminal, the mesh node having the activated bridge mode transmits rank information for connection to the user terminal corresponding to a distance to the user terminal and the mesh node's own traffic, the mesh node compares rank information received from a neighboring mesh node having an activated bridge mode with the mesh node's own rank information and generates a rank for connection to the user terminal, when the generated rank is not a higher priority, the mesh node excludes itself from the rank for connection to the user terminal, and when the generated rank is a higher priority, the mesh node operates as a bridge node for connection between the user terminal and the wireless mesh network.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
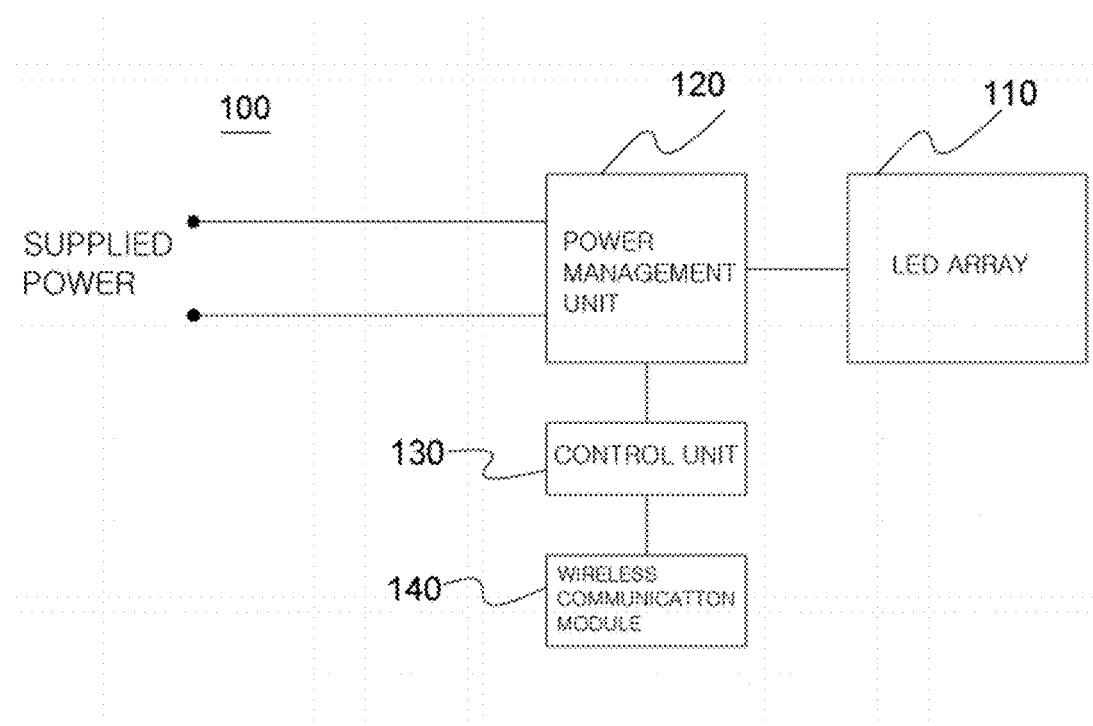
FIG. 1 is a schematic diagram of an LED lamp in an LED illumination system according to an embodiment of the present invention.

In the following detailed description of the present invention, references are made to the accompanying drawings that show, by way of illustration, specific embodiments in which the present invention may be implemented. These embodiments are described in sufficient detail to enable those skilled in the art to implement the present invention. It should be understood that various embodiments of the present invention, although different, are not necessarily mutually exclusive. For example, specific features, structures, and characteristics described herein, in connection with one embodiment, may be implemented within other embodiments without departing from the spirit and scope of the present invention. In addition, it should be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range equivalent to what the claims claim. In the drawings, like reference numbers refer to the same or similar function through many ways.

Hereinafter, embodiments of the present invention will be described with reference to the accompanying drawings, so that those skilled in the art can easily carry out the present invention.

FIG. 1 is a schematic diagram of an LED lamp 100 in an LED illumination system according to an embodiment of the present invention. Referring to FIG. 1, the LED lamp 100 may include an LED array 110, a power management unit 120, a control unit 130, and a wireless communication module 140.

The LED array 110 may include one or more LED devices that interoperate with input power and emit light.

The power management unit 120 may control supplied power so that power is input to the LED array 110.

The control unit 130 may control the power management unit 120 to operate the LED array 110 in response to a signal input set by a user through a user terminal.

The wireless communication module 140 may transmit a received wireless communication signal to the control unit 130 and transmit information received from the control unit 130 in the form of a wireless communication signal.

Figure 2:
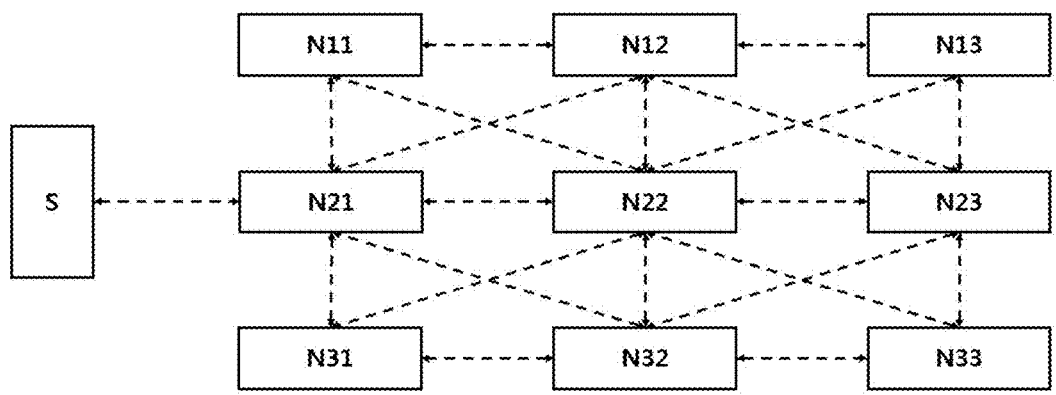
FIG. 2 is a schematic diagram of an LED illumination system according to an embodiment of the present invention.

FIG. 2 is a schematic diagram of an LED illumination system according to an embodiment of the present invention. The LED illumination system may include a plurality of LED lamps illustrated in FIG. 1 and a user terminal S.

The user terminal S may include any type of terminal capable of performing wireless communication, for example, a smartphone, a tablet, or a personal digital assistant (PDA). The user terminal S may output a control signal for controlling an LED lamp through wireless communication according to a user operation, or may store or display environment information received from a mesh network. In this regard, the user terminal S may include a plurality of user terminals, and each of the user terminals may be connected to a wireless mesh network through different bridge nodes.

The LED lamps are systematically configured to illuminate a specific space. The respective wireless communication modules of the LED lamps form mesh nodes N11, N12, ..., N33 for constituting the wireless mesh network, and a bridge mode of at least one of the mesh nodes is enabled. In this case, some of the mesh nodes constituting the wireless mesh network may be formed by wireless communication modules independently connected to a sensor unit that senses an ambient environment. The sensor unit may include at least one of a photosensor that senses an amount of ambient light, a motion sensor that senses an ambient motion, a temperature sensor that senses an ambient temperature, and a gas sensor that senses an ambient chemical gas.

When the control signal is received from the user terminal, the mesh node having the enabled bridge mode transmits rank intonation for connection to the user terminal corresponding to a distance to the user terminal and the mesh node's own traffic. The distance to the user terminal may be measured by at least one of a received signal strength intensity/indication (RSSI) method, a time-of-flight (TOF) method, a time-difference-of-flight (TDOF) method, an angle-of-arrival (AOA) method, and a phase-of-arrive (POA) method.

At the same time, the mesh node having the enabled bridge mode compares rank information received from a neighboring mesh node having an enabled bridge mode with the mesh node's own rank information and generates a rank for connection to the user terminal. When the generated rank is not a higher priority, the mesh node excludes itself from the rank for connection to the user terminal. On the other hand, when the generated rank is a higher priority, the mesh node operates as a bridge node for connection between the user terminal and the wireless mesh network.

That is, the bridge node is not installed at a specific position. If there is a signal of a user terminal in a state in which a mutual coverage is calculated and a bridge mode of a mesh node located at a position for serving as a bridge node is enabled, the mesh node located at a specific position serves as the bridge node according to the distance to the user terminal and the traffic for communication with an external network. Also, by rearranging the bridge mode of the mesh node preset by the operation of the bridge node located at the specific position, a lightweight protocol may be achieved for an efficient communication operation within the wireless mesh network. Accordingly, a control command for an LED lamp may be performed with minimum delay, and a user experience familiar with illumination of a wired environment may be maximally ensured.

In this way, the control signal transmitted from the user terminal S is received through the mesh node that performs the operation of the bridge node, and the received control signal is transmitted to a target LED lamp via the wireless mesh network.

The control unit of the target LED lamp controls the power management in response to the received control signal so that the LED array is operated according to the user setting.

The LED illumination system configured as above and the method for controlling the LED illumination system will be described below in more detail with reference to FIGS. 1 and 2.

First, the LED illumination system is configured in a specific space as illustrated in FIG. 2 by using a plurality of LED lamps illustrated in FIG. 1. The LED illumination system may further include a sensor unit that senses ambient environment information.

The wireless communication modules 140 of the LED lamps 100 and/or the wireless communication modules of the sensor unit constitute a wireless mesh network. The respective wireless communication modules form mesh nodes N11, N12, ..., N33 in the wireless mesh network. In this regard, the wireless mesh network may form a Low-power & Lossy Networks in such a manner that the wireless communication module to serve as an antenna like an existing wireless communication base station, e.g., wireless communication routers, becomes a mesh node and wirelessly connects all sections.

A bridge mode of at least one of the mesh nodes is enabled. In this case, a position of a mesh node having the enabled bridge mode may be set to be a specific position for efficient communication configuration by calculation of mutual coverage on a mesh network where a routing path optimized for data signal transmission is set.

When the control signal is received from the user terminal in a state in which the wireless mesh network is formed by such configuration, that is, when a signal for connection to the wireless mesh network is transmitted from the user terminal, the mesh node having the enabled bridge mode transmits rank information for connection to the user terminal according to a distance to the user terminal and a mesh node's own traffic for communication with an external network, and receives rank information transmitted from neighboring mesh nodes having enabled bridge modes.

In this case, the mesh node compares the received rank information of the neighboring mesh node with the mesh node's own rank information and generates a rank for connection to the user terminal.

When the generated rank is not a higher priority, the mesh node excludes itself from the rank for connection to the user terminal. When the generated rank is a higher priority, the mesh node operates as a bridge node so that the user terminal is connected to the wireless mesh network. For example, in order for the mesh node to exclude itself from the rank for connection to the user terminal, the mesh node may temporarily stop transmitting an information signal about the enabled bridge mode, or may temporarily transmit an information signal such as "no rank" as the rank information for connection to the user terminal.

That is, when the signal for connection to the mesh network is transmitted from the user terminal, one mesh node having a higher priority among the mesh nodes having the enabled bridge modes in a region close to the user terminal operates as a bridge node. The other neighboring mesh nodes exclude themselves from the rank for connection to the user terminal, thereby preventing traffic increase due to the communication with the user terminal.

The mesh node (N21 in FIG. 2) operating as the bridge node may receive a control signal through wireless communication with the user terminal S and transmit the received control signal to the neighboring mesh nodes.

In this manner, since the mesh node located at a specific position operates as the bridge node, preset mesh nodes having enabled bridge modes are rearranged for efficient network configuration.

That is, if mesh nodes having enabled bridge modes concentrate on a specific region due to a state change of a network according to the connection of the user terminal, traffic from an external network such as the user terminal may concentrate on a few bridge nodes in regions other than the specific region, thus causing a transient network deadlock. Therefore, unnecessary bridge modes are disabled in a region where mesh nodes having enabled bridge modes are dense. On the contrary, bridge modes of mesh nodes are additionally enabled in a region where mesh nodes having enabled bridge modes are sparse. For example, when the mesh node is located in a region where the mesh nodes having the enabled bridge modes are dense, the mesh node checks the mesh node's own communication state and disables the bridge mode when high traffic for communication with the external network does not occur. Also, when the mesh node is located in a region where the mesh nodes having the enabled bridge modes are sparse, the mesh node checks the mesh node's own communication state and enables the bridge mode when high traffic for communication with the external network occurs.

Also, in a case where the mesh node having the enabled bridge mode is located at a predetermined hop distance previously set with the mesh node, for example, at a 2-hop distance, and traffic for communication with the external network increases at the mesh node having the enabled bridge mode, the mesh node checks the mesh node's own communication state and may enable the bridge mode when the traffic for communication with the external network is less than or equal to a first setting value of a resource, for example, 30%. In this case, the 2-hop distance has been presented as the position of the mesh node having the enabled bridge mode, at which the traffic increases, and this is merely one embodiment. Any position may be used as long as the position is located within a hop distance previously set that is located within the coverage of the mesh node and has a certain distance from the mesh node.

Also, during the enabling of the bridge mode, in a case where the bridge mode of at least one of the mesh nodes located at the 1-hop distance from the mesh node is enabled, the mesh node checks the mesh node's own communication state and may disable the bridge mode when the traffic for communication with the external network is less than or equal to a second setting value of a resource, for example, 20%.

During the enabling of the bridge mode, when the mesh node checks the mesh node's own communication state and the traffic for communication with the external network is greater than or equal to a third setting value of a resource, for example, 70%, the mesh node may support the enabling of the bridge mode of at least one of the mesh nodes positioned at a predetermined hop distance previously set with itself, for example, at a 2-hop distance.

In this manner, when the mesh node located at a specific position operates as the bridge node and thus the mesh network is connected to the user terminal that is the external network, an efficient network operation can be achieved by rearranging the mesh node having the enabled bridge mode on the mesh network.

In this case, since the mesh node assigns identification information to neighboring mesh nodes, based on a Routing Protocol for Low-power Lossy Networks (RPL) rank, a relation index, and a bloom filter value and stores the assigned identification information as a routing table, the mesh node may confirm the position of the neighboring mesh node with reference to the stored routing table.

Figure 3:
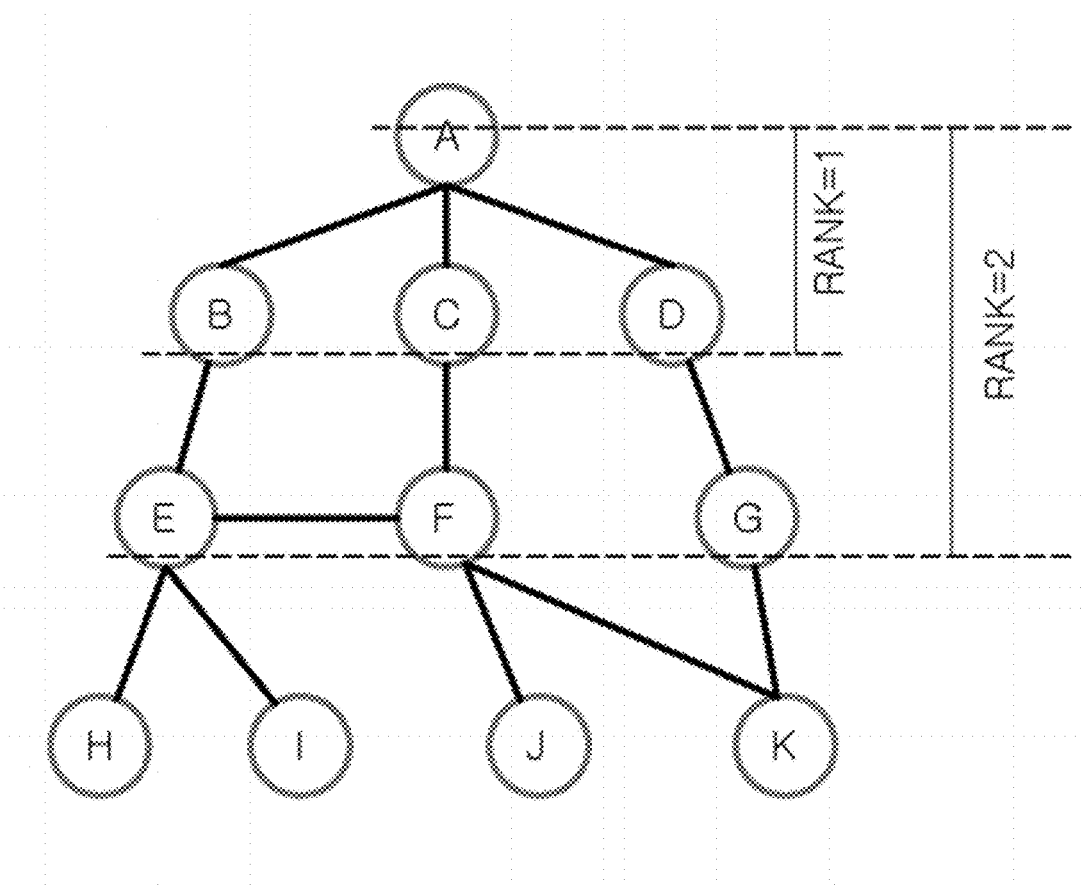
FIG. 3 is a schematic diagram illustrating a checking of neighboring mesh nodes in an LED illumination system according to an embodiment of the present invention.

That is, as illustrated in FIG. 3, the rank in the RPL is a metric given according to depths of child nodes from a root node and may be assigned to each node.

For example, since a node E is present at a 2-depth position from a root node A, a rank of the node E is 2. Neighboring nodes are nodes B, F, H, and I, a parent node is a node B, a sibling node is a node F, and child nodes are nodes H and I. That is, each node in the RPL has the rank and relative relation information (parent/sibling/child nodes) between nodes as additional information, in addition to each node's identifier. A transmitted data signal has information on a source node and a destination node.

Among such additional information, the neighboring nodes may be managed through the routing table by securing a search direction for a destination node in a forward direction and securing information on child nodes, which can be accurately and clearly recognized and managed by each node, in a backward direction.

Also, since the network in the RPL is based on a graph structure having directionality, the accuracy of the node identification may be increased by using information on the forward direction and the backward direction.

Therefore, simplified identification information may be assigned by using the RPL rank and the index information assigned to the child node by each node. For example, in FIG. 3, the node A may assign child indices 0, 1, and 2 to the child nodes B, C, and D. In this case, an identification value composed of key(Rank,ChildIndex)–value(BloomFilter-Value) may be stored in the routing table of the node A.

Also, since the node B is located at rank=1 from the node A and the child index 0 is assigned to the node B, the node B has key=(1,0) and value=(bloom filter value). Similarly, the node C may have key=(1, 1) and value=(bloom filter value), and the node D may have key=(1,2) and value=(bloom filter value). That is, in the routing table configuration and management, each node within the network may grasp the positions of the neighboring nodes by actively using the directional graph structure of the RPL.

The mesh node may use a bloom filter value to confirm whether a specific node is present on a routing path.

In this regard, the mesh node may calculate a hash function value by using an address value in the mesh network and may generate a bloom filter value by substituting "1" for a bit of an index corresponding to the hash function value.

For example, when a bit length of a bloom filter is assumed to be L and there are x different hash functions H1, H2, . . . , Hx having a range of 0 to L−1 as a result value, a result obtained by inputting an identifier of "node a" in the network to each hash function H1, H2, . . . , Hx is processed as a bit index of a bloom filter and "1" is substituted for a value of a corresponding position, thereby generating a bloom filter value of "node a".

For example, when there are two nodes "node a" and "node b" respectively having addresses "2001::25de::cade" and "::C000:0234" in the mesh network and there are hash functions H1, H2, H3, and H4 for generating a bloom filter value of L=16, all digits of which are reset to 0, a value of "0000001110100000" may be generated as the bloom filter value of the "node a" by substituting "1" for bits of tenth, sixth, eighth, and seventh indices of a bloom filter value having a 16-bit length according to results of the hash functions H1 (2001::25de::cade)=10, H2 (2001::25de::cade)=6, H3 (2001::25de::cade)=8, and H4 (2001::25de::cade)=7. Also, in the same manner as the "node a", a value of "0110110000000000" may be generated as the bloom filter value of the "node b" according to results of the hash functions H1 (::C000:0234)=1, H2 (::C000:0234)=6, H3 (::C000:0234)=5, and H4 (::C000:0234)=2.

As described above, the bloom filter value of each mesh node in the mesh network may be used as the identifier for node identification.

Therefore, each mesh node in the mesh network may grasp the positions of the neighboring mesh nodes through the RPL rank, the relation index, and the bloom filter value.

The traffic analysis in the mesh node may be performed by using a cumulative path expected transmission count metric (ETX).

In this case, the cumulative path ETX may be calculated by the product of ETX values between two nodes obtained by coupling all nodes located within the routing path. For example, the cumulative path ETX may be calculated by ETX(Root,A)×ETX(A,B)× . . . ×ETX(X,N).

That is, since one node has directionality having a parent node above the node and a child node below the node, a health condition of an entire path, that is, a traffic condition may be confirmed by calculating and accumulating ETXs, which are data transmission amounts expected between the coupled links according to a direction of data transmission from a source to a destination or root.

Also, the ETX is the result obtained by dividing the number (numTX) of transmitted messages by the number of acknowledges (ack) received in response to the transmitted messages. The ETX may be expressed by $$ETX = \frac{numTX}{numTX - ack}.$$

A small ETX means that the number of attempts that the corresponding node has made to transmit data is small. When a node having a small ETX value is selected and data is transmitted, more efficient data transmission may be achieved.

Due to such a configuration, when the control signal is transmitted to the user terminal S, one of the mesh nodes having the enabled bridge modes operates as the bridge node. Thus, the mesh node operating as the bridge node receives a data signal transmitted from the user terminal S and transmits the received data signal to a mesh node corresponding to a target LED lamp, that is, an LED lamp whose control is selected by the user, via the mesh network.

Also, ambient environment information sensed by the sensor unit may be transmitted to the user terminal S or building security facilities via the mesh network. Accordingly, it is possible to warn a dangerous situation such as a fire or gas leakage occurring in a specific space where the LED illumination system is installed.

According to one or more embodiments, wireless communication modules are installed in LED lamps constituting an LED illumination system, and the respective wireless communication modules constitute a mesh network. Therefore, the LED illumination system may be operated by using a user terminal without regard to a position of the user terminal.

According to one or more embodiments, since an LED illumination system is operated without regard to a position of a user terminal, a position of a wireless communication module need not be set and an initial installation work of the LED illumination system is facilitated.

According to one or more embodiments, wireless communication modules in a mesh network may quickly respond to a network change and dynamically constitute an optimized bridge node, based on autonomous communication, so as to enable smooth communication with a user terminal without regard to nodes in relation to newly added or removed LED lamps.

According to one or more embodiments, a lightweight protocol may be achieved for efficient communication operation within a wireless mesh network for an LED illumination system based on the Internet of Things (IoT) environment. Accordingly, a control command for an LED lamp may be performed with minimum delay, and a user experience familiar with illumination of a wired environment may be maximally ensured.

In the foregoing descriptions, although the present invention has been described in connection with the specific matters, such as the specific components, the specific embodiments, and the drawings, they are provided only for assisting in the understanding of the present invention, and the present invention is not limited to the embodiments. It will be apparent that those skilled in the art can make various modifications and changes thereto from these descriptions.

Therefore, the spirit of the present invention should not be limited to the aforementioned embodiments, and the appended claims and what are modified equally or equivalently thereto will be considered to fall within the scopes of the present invention.

What is claimed is:

1. An LED illumination system comprising:
a plurality of LED lamps, each LED lamp comprising:
an LED array including one or more LED elements that interoperate with input power and emit light;
a power management unit that controls supplied power so that power is input to the LED array;
a control unit that controls the power management unit to control an operation of the LED array in response to a signal input set by a user through a user terminal; and
a wireless communication module that transmits a received wireless communication signal to the control unit and transmits information received from the control unit in the form of a wireless communication signal,
wherein the wireless communication modules of the LED lamps form mesh nodes for constituting a wireless mesh network,
a bridge mode of at least one of the mesh nodes is enabled, the bridge mode being dynamically configured according to a distance to the user terminal and the mesh node's own traffic, one of the mesh nodes having the enabled bridge mode operating as a bridge node, whereby the bridge node needs not to be set at a specific position and an installation of the LED illumination system is facilitated, and the wireless communication modules in the wireless mesh network quickly respond to a network change and dynamically constitute the bridge node optimized based on autonomous communication, so as to enable smooth communication with the user terminal without regard to nodes in relation to newly added or removed LED lamps,
when a control signal is received from the user terminal, each mesh node having the enabled bridge mode transmits rank information for connection to the user terminal corresponding to a distance to the user terminal and the each mesh node's own traffic,
the each mesh node compares rank information received from a neighboring mesh node having the enabled bridge mode with the each mesh node's own rank information and generates an order of priority for connection to the user terminal,
the mesh node with a lower order of priority excludes itself from the rank for connection to the user terminal, and
the mesh node with a highest order of priority operates as the bridge node for connection between the user terminal and the wireless mesh network,
wherein the bridge mode of the mesh nodes is rearranged considering a position of the mesh node operating as the bridge node, whereby a lightweight protocol is achieved for an efficient communication operation within the wireless mesh network, and a control command for the each LED lamp is performed with minimum delay.

2. The LED illumination system of claim 1, wherein
when the mesh node is located in a region where the mesh nodes having the enabled bridge modes are dense, the mesh node checks the mesh node's own communication state and disables the bridge mode, and
when the mesh node is located in a region where the mesh nodes having the enabled bridge modes are sparse, the mesh node checks the mesh node's own communication state and enables the bridge mode.

3. The LED illumination system of claim 1, wherein
when the mesh node having the enabled bridge mode is located at a predetermined hop distance previously set with the mesh node and traffic for communication with an external network increases at the mesh node having the enabled bridge mode, the mesh node checks the mesh node's own communication state and enables the bridge mode when the traffic for communication with the external network is less than or equal to a first setting value of a resource.

4. The LED illumination system of claim 1, wherein
when the bridge mode of at least one of the mesh nodes located at a 1-hop distance from the mesh node is enabled during the enabling of the bridge mode, the mesh node checks the mesh node's own communication state and disables the bridge mode when the traffic for communication with an external network is less than or equal to a second setting value of a resource.

5. The LED illumination system of claim 1, wherein
during the enabling of the bridge mode, when the mesh node checks the mesh node's own communication state and the traffic for communication with an external network is greater than or equal to a third setting value of a resource, the mesh node supports the enabling of the bridge mode of at least one of the mesh nodes located at a predetermined hop distance previously set with the mesh node.

6. The LED illumination system of claim 1, wherein
the mesh node assigns identification information to neighboring mesh nodes, based on a Routing Protocol for Low-power Lossy Networks (RPL) rank, a relation index, and a bloom filter value, stores the assigned identification information as a routing table, and confirms positions of the neighboring mesh nodes with reference to the stored routing table.

7. The LED illumination system of claim 1, further comprising:
a sensor unit that senses an ambient environment, the sensor unit including at least one of a photosensor that senses an mount of ambient light, a motion sensor that senses an ambient motion, a temperature sensor that senses an ambient temperature, and a gas sensor that senses an ambient chemical gas; and
a wireless communication module connected to the sensor unit, the wireless communication module constituting the mesh node of the wireless mesh network.

8. The LED illumination system of claim 1, wherein
the distance to the user terminal is measured by at least one of a received signal strength intensity/indication (RSSI) method, a time-of-flight (TOF) method, a time-difference-of-flight (TDOF) method, an angle-of-arrival (AOA) method, and a phase-of-arrive (POA) method.

9. A method for controlling an LED illumination system, which includes a plurality of LED lamps, each LED lamp including: an LED array including one or more LED elements that interoperate with input power and emit light; a power management unit that controls supplied power so that power is input to the LED array; a control unit that controls the power management unit to control an operation of the LED array in response to a signal input set by a user through a user terminal; and a wireless communication module that transmits a received wireless communication signal to the control unit and transmits information received from the control unit in the form of a wireless communication signal, the method comprising:
a first operation in which the wireless communication modules of the LED lamps form mesh nodes for constituting a wireless mesh network, and a bridge mode of at least one of the mesh nodes is activated, the bridge mode being dynamically configured according to a distance to the user terminal and the mesh node's own traffic, one of the mesh nodes having the enabled bridge mode operating as a bridge node, whereby the bridge node needs not to be set at a specific position and an installation of the LED illumination system is facilitated, and the wireless communication modules in the wireless mesh network quickly respond to a network change and dynamically constitute the bridge node optimized based on autonomous communication, so as to enable smooth communication with the user terminal without regard to nodes in relation to newly added or removed LED lamps; and
a second operation in which, when a control signal is received from the user terminal, each mesh node having the enabled bridge mode transmits rank information for connection to the user terminal corresponding to a distance to the user terminal and the each mesh node's own traffic, the each mesh node compares rank information received from a neighboring mesh node having the enabled bridge mode with the each mesh node's own rank information and generates an order of priority for connection to the user terminal, the mesh node with a lower order of priority excludes itself from the rank for connection to the user terminal, and the mesh node with a highest order of priority operates as the bridge node for connection between the user terminal and the wireless mesh network, wherein the bridge mode of the mesh nodes is rearranged considering a position of the mesh node operating as the bridge node, whereby a lightweight protocol is achieved for an efficient communication operation within the wireless mesh network, and a control command for the each LED lamp is performed with minimum delay.

10. The method of claim 9, wherein
when the mesh node is located in a region where mesh nodes having enabled bridge modes are dense, the mesh node checks the mesh node's own communication state and disables the bridge mode, and
when the mesh node is located in a region where the mesh nodes having the enabled bridge modes are sparse, the mesh node checks the mesh node's own communication state and enables the bridge mode.

11. The method of claim 9, wherein
when the mesh node having the enabled bridge mode is located at a predetermined hop distance previously set with the mesh node and traffic for communication with an external network increases at the mesh node having the enabled bridge mode, the mesh node checks the mesh node's own communication state and enables the bridge mode when the traffic for communication with the external network is less than or equal to a first setting value of a resource.

12. The method of claim 9, wherein, when the bridge mode of at least one of the mesh nodes located at a 1-hop distance from the mesh node is enabled during the enabling of the bridge mode, the mesh node checks the mesh node's own communication state and disables the bridge mode when the traffic for communication with an external network is less than or equal to a second setting value of a resource.

13. The method of claim 9, wherein
during the enabling of the bridge mode, when the mesh node checks the mesh node's own communication state and the traffic for communication with an external network is greater than or equal to a third setting value of a resource, the mesh node supports the enabling of the bridge mode of at least one of the mesh nodes located at a predetermined hop distance previously set with the mesh node.

14. The method of claim 9, wherein
the mesh node assigns identification information to neighboring mesh nodes, based on a Routing Protocol for Low-power Lossy Networks (RPL) rank, a relation index, and a bloom filter value, stores the assigned identification information as a routing table, and confirms positions of the neighboring mesh nodes with reference to the stored routing table.

15. The method of claim 9, wherein
the LED illumination system further includes:
a sensor unit that senses an ambient environment, the sensor unit including at least one of a photosensor that senses an mount of ambient light, a motion sensor that senses an ambient motion, a temperature sensor that senses an ambient temperature, and a gas sensor that senses an ambient chemical gas; and
a wireless communication module connected to the sensor unit and constituting the mesh node of the wireless mesh network.

16. The method of claim 9, wherein
the distance to the user terminal is measured by at least one of a received signal strength intensity/indication (RSSI) method, a time-of-flight (TOF) method, a time-difference-of-flight (TDOF) method, an angle-of-arrival (AOA) method, and a phase-of-arrive (POA) method.

* * * * *